United States Patent Office

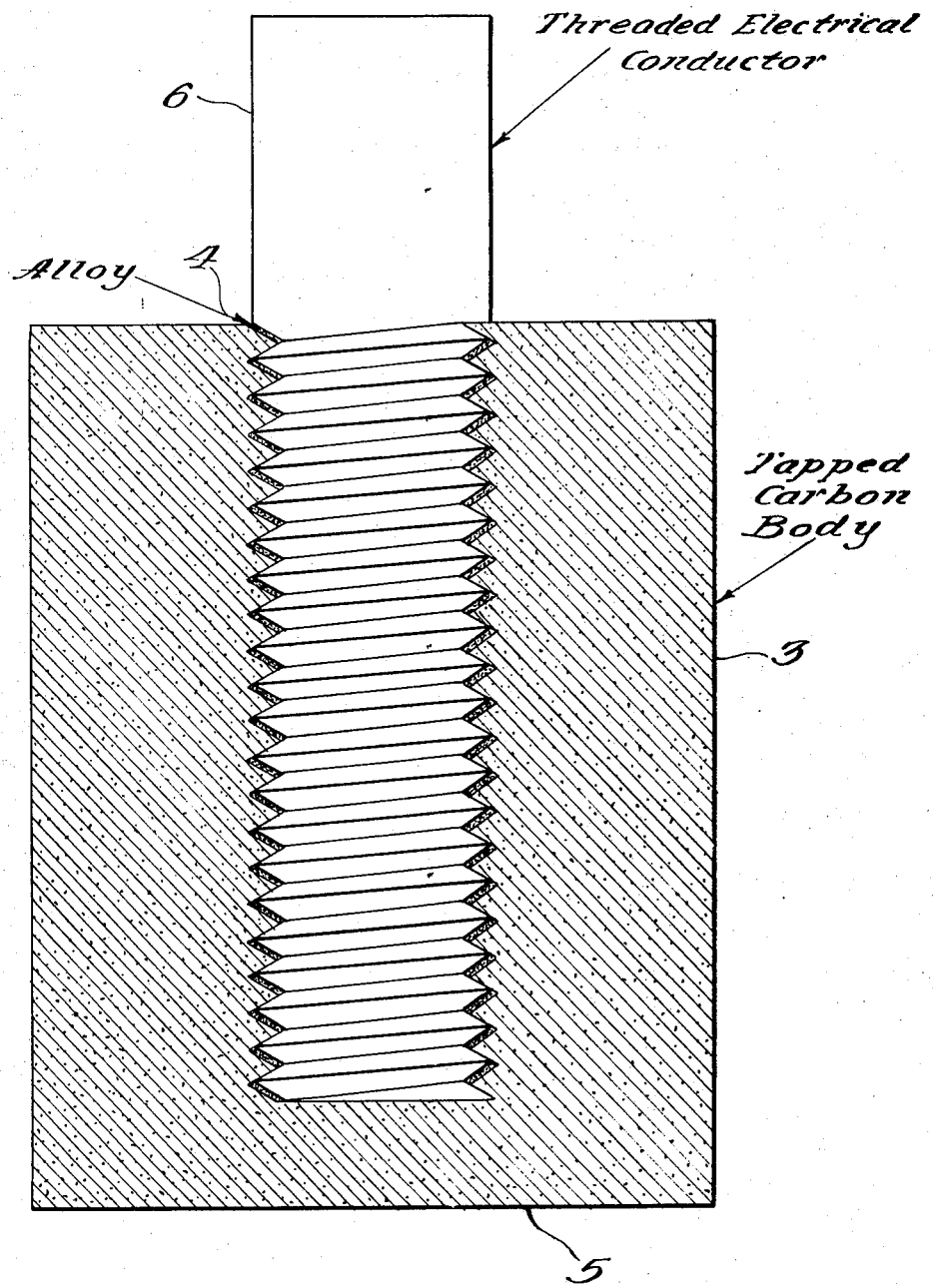

3,536,460
Patented Oct. 27, 1970

3,536,460
CONNECTIONS BETWEEN ELECTRICAL CONDUCTORS AND CARBON BODIES AND METHOD OF MAKING SAME
Marvin W. Voelker, Buffalo, N.Y., assignor to Great Lakes Carbon Corporation, New York, N.Y., a corporation of Delaware
Filed Dec. 28, 1966, Ser. No. 605,285
Int. Cl. B32b 33/00
U.S. Cl. 29—195                                                14 Claims

---

ABSTRACT OF THE DISCLOSURE

A low electrical resistance joint assembly is made between a carbon body and an electrical conductor. One of these assembly members contains an internally threaded recess and the other is externally threaded and the two members are in threaded engagement. An alloy is within the recess between threads of the carbon body and threads of the conductor. The alloy has been heated above its melting point, and is then cooled to solidify it between threads of the assembly members. Threaded engagement between the conductor and the carbon body is effected while the alloy is in a molten condition within the recess.

---

The alloy expands or exhibits cumulative growth during and after solidification, thus adding to the mechanical bond and engagement between the threaded carbon body and the threaded electrical conductor and thus forming a connection of low electrical resistance and good strength.

Typically the carbon body may be a graphite lead-in rod, the electrical conductor a copper rod, and the connections made are for use in electrolytic cells.

This invention relates most particularly to graphite pins for mercury cell anode plates and end connector plates for chlorate cells, and joints between such pins and end connector plates and copper bars. More broadly, the invention relates to unique connections between an electrical conductor and a carbon body which can be used for any purpose, such as in electrolytic cells, or elsewhere, and to methods of preparing same.

Several designs of mercury-cathode chlor/alkali cells use graphite pins or stems to support the anode plates and carry the operating current through the cell cover from the external current source to the anode plate. Such pins are illustrated in the accompanying drawing. These pins 3 typically have a hole or recess drilled in their center and a copper bar or rod 6 fixed in this hole and extending above the top end of the graphite pin. In such a typical construction, the diameter of the copper bar is less than the diameter of the hole in the graphite and the annular space between the copper and graphite is filled with an electrically conducting material by means of which a connection is made between the copper and graphite. This connection is intended to be mechanically strong and to have a low electrical resistance. The end 5 of the pin 3 is used for coupling to the anode plate in order to support said plate. This connection is typically made either by press-fitting or threading the pin 3 into a mating cylindrical or threaded hole in the top of the anode plate.

An end connector plate for chlorate cells, also typically made of graphite, may employ the same type connection and have a hole drilled through most of its length near one edge. A copper bar is fixed in this hole and the end of the bar extends above the top of the graphite plate. The diameter of the copper bar is smaller than the diameter of the hole in the graphite plate, and, as in the case of the graphite pins just described, this annular space between the copper and the graphite is filled with an electrically conducting material by means of which a connection is made between the copper and graphite. This connection is also intended to be mechanically strong and to have a low electrical resistance. The end connector plates are typically reinforced in the area of the drilled hole by graphite reinforcing strips cemented to the plate on the opposing sides. Alternatively, they are reinforced by having been machined with a thicker cross-section near the edge and in the region wherein the hole is located.

The present invention is chiefly concerned with and has as one of its objects the making of a low-electrical resistance, high-strength joint between an electrical conductor, such as a copper or aluminum or steel or carbon rod, and a graphite pin or plate which can conveniently be used as an electrical coupling to an anode of an electrolytic cell; and/or to the making of such joints in end connector plates for chlorate cells. The invention, however, is applicable to any such low-electrical resistance, high-strength joint made according to the teachings of this invention, no matter where or how it is used. Such joints made according to the present invention offer several advantages over joint construction utilized in the past, such as substantially reduced voltage drop through the joint, increased joint strength, and substantially uniform electrical resistance for prolonged periods of time. Further other objects and advantages will become apparent after a review of the description of the present invention, and the comparison of same with other practices in the art.

It is a finding of the present invention that an electrical conductor, such as a copper rod, may conveniently and advantageously be coupled to a lead-in rod, graphite pin, or carbon body by means of the combination of a threaded engagement and an expanding alloy between the electrical conductor and the carbon body. The alloy is heated to a temperature above its melting point and is then permitted to cool below its melting point within a threaded recess in one of the members to be joined, into which the other member (which is also threaded) is threaded while the alloy is molten. The alloy is characterized by its exhibiting a cumulative growth during and after solidification. Thus a tight mechanical bond as well as a threaded engagement is developed between the carbon body and the electrical conductor, forming a low resistance electrical connection. The alloy is further characterized by having a melting point between about 95° C. and about 300° C. The alloy also typically possesses an electrical resistivity between about $0.5 \times 10^{-5}$ and about $5.0 \times 10^{-5}$ ohm-inches and preferably no higher than $10 \times 10^{-5}$ ohm-inches. It is preferable, although not necessary, that the alloy "wet" or bond to the threaded electrical conductor (e.g. to the threaded copper rod if that is what is used).

There are many alloys which fulfill the foregoing requisites and which can be employed in the invention. The following compositions, wherein the numbers are approximate percentages by weight, and having the properties set forth opposite same, are typical or preferred alloys which may be used:

| Alloy | Melting temperature or range, °C. | Electrical resistivity of alloy in ohm-inches |
|---|---|---|
| a. 58 bismuth, 42 tin | 138 | $1.35 \times 10^{-5}$ |
| b. 55.5 bismuth, 44.5 lead | 124 | $3.45 \times 10^{-5}$ |
| c. 48 bismuth, 28.5 lead, 14.5 tin, 9 antimony | 103–227 | $2.62 \times 10^{-5}$ |
| d. 15 antimony, 58 lead, 26 tin, 1 copper | 230–280 | $9.82 \times 10^{-5}$ |
| e. 15 antimony, 82 lead, 3 tin | 275 | $0.49 \times 10^{-5}$ |

Because of the fact that all of the foregoing alloys exhibit a cumulative growth during and after solidification (as a result of expansion either upon being cooled from their molten state to their solid state, and/or because of linear growth after solidification), a very tight joint or connection is made between the electrical conductor and the carbon body. The joint so made is also very strong mechanically and has a very low electrical resistance when any of these alloys is used in making the threaded connection as described herein.

Before the connection is made, and with reference to the particular construction illustrated in the drawing but not restricted thereto, the electrical conductor or copper bar or rod is prepared for use by threading a portion of its length such as illustrated in the drawing, and also generally by mechanical and/or chemical cleaning. The carbon body or graphite stem or end connector plate is correspondingly threaded, by tapping, and is also generally prepared by blowing the threaded recess out with air pressure or otherwise cleaning it. The external threads of the electrical conductor and the internal threads of the recess are so designed that the threaded engagement is not so tight that it is impossible for the alloy to be forced between the mating threads when the conductor is threaded into the recess.

Unified screw thread standards such as set forth in Tables 1–7 for classes 1A, 1B, 2A, 2B, 3A and 3B in Order 50–7 from the NBS Circular 479; (Supplement to NBS Handbook H28; and A.S.A. B1.1—1949—all dated 1949) are indicative of the threaded arrangements which may be used for the electrical conductor and carbon body employed in the present invention. Typically a standard thread size appropriate for the diameter of the conductor will be used. The conductors used in the present invention will typically be copper having a diameter between about ½ inch and about 4 inches for most of the uses contemplated in using the connections of the present invention. The connection is made by a procedure such as now described.

In one method, (illustrated by using copper as the electrical conductor and graphite as the carbon body) both the externally threaded copper bar or rod and the internally threaded graphite stem or plate are preheated to some convenient temperature above the melting point of the alloy being used. A quantity of molten alloy sufficient to fill the space between the threads and to rise to the top of the connection is then poured into the hole in the graphite and the copper bar is threaded into the hole, typically until it is hand-tight. As the copper bar approaches the bottom of the hole and reaches the molten alloy, the alloy 4 is forced to rise around the copper bar and to distribute itself between the threads of the conductor and the graphite. Typically, and as illustrated in the drawing, the alloy 4 will be between the bottom sides of the threads of the copper conductor and the upper sides of the threads of the graphite, with direct contact between the upper sides of the threads of the copper and the lower sides of the threads of the graphite. Alloy 4 may also be found between the bottom of the copper bar 6 and the bottom of the recess. Any excess alloy 4 forced to the top of the connection can be poured or brushed off. The assembly is then allowed to cool to a temperature below the freezing or solidification point of the alloy.

Alternative procedures may also be used which would involve heating the copper conductor and graphite body to temperatures other than above the melting point of the alloy.

In another method, a pellet (or pellets) of alloy (or alloy powder) sufficient to fill the space between the threads and to rise to the top of the connection when melted is placed in the bottom of a threaded and cleaned recess of a graphite stem or end connector plate. The threaded and cleaned copper bar, prepared as before, is threaded into the threaded recess in the graphite to contact the top of the pellet (or powder) of alloy, all materials being then at room temperature. The assembly is then heated uniformly by a suitable method to a temperature in excess of the melting point of the alloy. The copper bar is then threaded further into the threaded recess in the graphite until it is approximately hand-tight and thus forces the molten alloy to rise and to fill the space between the threads. Any excess alloy is poured off as in the first assembly method. The assembly is then cooled to "freeze" or solidify the alloy.

Advantages of the type of copper to graphite or electrical conductor to carbon body connection made by the methods disclosed in this invention are: the joints are tight and mechanically strong; the joints have lower electrical resistance than joints made with solders containing tin and lead only which do not expand upon cooling; the joints also have lower electrical resistance than connections made by means of threads alone or by means of an expandable alloy alone; the electrical resistance of the joints is substantially stable for prolonged periods of time; the joints are easy to assemble and free from susceptibility to vibration and handling effects; in addition, if the assembly is employed in an application where inadvertently the temperature rises above the melting point of the alloy, the conductor and the carbon body will remain joined by the threads. Further, the low-resistance nature of the joint will be re-established automatically upon cooling of the assembly below the melting point of the alloy.

The following examples further illustrate the invention:

EXAMPLE 1

Two assemblies were prepared according to the aforedescribed first method and as illustrated in the drawing. the assemblies were made using graphite pins 2½ inches in diameter and 7⅛ inches long as the carbon body, copper 1 inch in diameter and 14⅜ inches long as the electrical conductor, and 58 bismuth, 42 tin as the alloy. In both assemblies, 5⅞ inches of one end of the flat bottomed copper rods were threaded in accordance with specifications of the aforedescribed Unified Screw Thread Standards for 1 inch diameter, 8 threads per inch, UNC–2A. One of the graphite pins was bored and tapped for 1 inch–8 threads per inch, UNC–2B to a depth of 5⅜ inches. The other graphite pin was bored and tapped for 1⅛ inches–8 threads per inch, UNC–2B to a depth of 5⅜ inches. Both graphite pins were reamed to 1⅛ inch diameter for an addition ⅜₁₆ inch making the overall hole depth 5⁹⁄₁₆ inches. The hole bottoms were also flat. Joint resistances were measured by passing a known current through the completed assemblies via electrical contacts attached to the extreme ends of the assemblies. Voltage drop across the joints was measured by attaching radial contacts around the copper rods just above the point where the copper emerges from the graphite and around the graphite pin at a point just below the end of the copper rod. The null balance method of measuring voltage drop was used to avoid the effects of contact resistance. The results of these tests demonstrated that the joint resistances as measured by the voltage drops across the joints were very low; and that the resistances and voltage drops were substantially lower than those of joints made with solders containing tin and lead only which do not expand upon cooling, or than those of joints made by means of threads alone, or by means of an expandable alloy alone (viz without the added feature of the threaded engagement). The assemblies were then heated in air to 95° C. for a period of 10 days, cooled to room temperature and their voltage drops were measured again. They were tested in this manner for 150 days with no significant change in the originally low resistances and/or voltage drops.

Several anode stems were also assembled according to the aforedescribed first method and using the alloys *b–e*. Results similar to those of Example 1 were obtained. Very satisfacotry results were also obtained using the alloys *a–e* in the other assembly method previously described.

In use in an electrolytic cell, the lead-in rod assembly and the anode and the connection between same are seldom heated to temperatures above 80–90° C. Therefore, when used in an electrolytic cell, the alloy used to make the joint is not generally heated to a temperature above about 95° C. nor are such temperatures at all desirable or necessary. Because the connections made in the present invention include the heating of the alloy up to elevated temperatures so as to cause the alloy to melt and then solidify upon cooling, it is preferred that for any given use and for optimum results the joint be used below the melting point of the particular alloy used. As illustrated by the properties set forth of the alloys a–e, the melting point or range of the alloys used in the present invention vary from about 103° C. to about 280° C., or slightly less than about 300° C. However, as previously pointed out, because the joint is threaded an inadvertent temperature rise above the melting point of the alloy will not destroy the connection, and when the temperature is again lowered below this point the joint is substantially as good as it was initially.

The joints of this invention are easily adaptable to lead-in pins of the threaded or non-threaded (e.g. pressed-fit) type, i.e. with respect to the portion 5 of the pin which is coupled to the anode, and can easily be prepared by the manufacturer of the anodes and/or the manufacturer of the lead-in pins as well as by the cell operators. In other words, if desired, the lead-in assembly of the copper rod and graphite pin can be prepared in advance and shipped to the cell operator and does not have to be prepared at the site of the cell. They (the cell operators) can also prepare the present joints.

The low resistance joints or connections of the present invention can be used in arts or fields other than the electrolytic cell art, for example in the carbon brush field, or in making a low-resistance coupling between any electrical conductor and a carbon body. Also, in this context, the term "carbon body" is intended to connote or include either baked (or amorphous) or semi-graphitic or graphitized carbon bodies, impregnated or unimpregnated, which bodies also can vary greatly in their size and shape, density and porosity, and ultimate intended use. In certain instances, or for certain applications, the "carbon bodies" of this invention may also include minor amounts of materials other than strictly carbon or graphite, such as sintered metals. All such joints or connections, however, are characterized by having a threaded recess in one of the members to be joined, which recess is adapted for the threaded engagement of a matching threaded electrical conductor therein and also for the hereindescribed alloys therebetween. Typically the threaded recess will be in the carbon body, which will thus be internally threaded, and the electrical conductor will be externally threaded. However, this may be reversed and the electrical conductor may contain the threaded recess and be internally threaded and the carbon body may be the male, externally threaded member. The threaded recess will typically and preferably be cylindrical, although it may also have other shapes such as a threaded truncated cone. It is obvious, of course, that the recess must terminate within the member containing same, rather than extend all the way through, in order that the methods of making the connections of this invention may be carried out. Its size and shape and depth will be dependent upon the size and shape of the carbon body and/or of the electrical conductor. As aforesaid, however, the recess will most preferably be cylindrical and the externally threaded male member to be inserted into same will also be cylindrical, with a slight clearance therebetween such as provided by various standard thread gauge systems used, i.e. NC, UNC, etc., so as to permit the forcing of the molten alloy between the threads and up out of the recess as the male member is threaded into the female member. In any case, however, the joint will be effected by a threaded engagement between the electrical conductor and the carbon body and also by melted alloys which exhibit a cumulative growth during and after solidification as previously described. The space between the threads of the electrical conductor and threads of the carbon body may be varied and will be dependent somewhat upon the depth of the threaded recess in the female member and the degree of penetration of the threaded male member into same and the strength of the joint required and the purpose or end use for the assembly. It should be noted, however, that while this variable spacing between the threads is generally kept to a minimum to reduce overall joint resistance, there must be sufficient clearance to permit the molten alloy to be forced therebetween in order to accomplish the purposes of the invention.

Having thus described the nature of my invention and the uses for same, but being limited only by the appended claims with respect to the scope of the invention, I claim:

1. A joint assembly comprising a carbon body and an electrical conduction one of which contains an internally threaded recess and the other of which is externally threaded, and both being in threaded engagement, said assembly including an alloy within said recess between threads of the conductor and threads of the carbon body, said alloy having been heated to a temperature above its melting point and which alloy has then been permitted to cool below its melting point within said threaded recess after the threaded engagement between the conductor and the carbon body has been effected, said alloy exhibiting a cumulative growth during and after solidification thus adding to the mechanical bond and engagement between the threaded carbon body and the threaded electrical conductor and thus forming a low resistance electrical connection, said alloy also having a melting point between about 95° C. and about 300° C.

2. The joint assembly of a carbon body, an electrical conductor, and an alloy according to claim 1 wherein said alloy possesses an electrical resistivity no higher than $10 \times 10^{-5}$ ohm-inches.

3. The joint assembly of a carbon body, an electrical conductor, and an alloy according to claim 1 wherein the electrical conductor is an externally threaded copper rod, wherein the carbon body contains the internally threaded recess, and wherein the carbon body is graphite.

4. The joint assembly of a carbon body, an electrical conductor, and an alloy according to claim 3 wherein the graphite body is a lead-in rod for use in electrolytic cells.

5. A joint assembly comprising a carbon body and an electrical conductor one of which contains an internally threaded recess and the other of which is externally threaded, and both being in threaded engagement, said assembly including an alloy within said recess between threads of the conductor and threads of the carbon body, said alloy having been heated to a temperature above its melting point and which alloy has then been permitted to cool below its melting point within said threaded recess after the threaded engagement between the conductor and the carbon body has been effected, said alloy exhibiting a cumulative growth during and after solidification thus adding to the mechanical bond and engagement between the threaded carbon body and the threaded electrical conductor and thus forming a low resistance electrical connection, and said alloy being selected from the group consisting of the following compositions wherein the numbers are approximate percentages by weight:

58 bismuth, 42 tin;
55.5 bismuth, 44.5 lead;
48 bismuth, 28.5 lead, 14.5 tin, 9 antimony;
15 antimony, 58 lead, 26 tin, 1 copper; and
15 antimony, 82 lead, 3 tin.

6. The joint assembly of a carbon body, an electrical conductor, and an alloy according to claim 5 wherein the alloy used is 58 bismuth, 42 tin.

7. The joint assembly of a carbon body, an electrical conductor, and an alloy according to claim 5 wherein the alloy used is 55.5 bismuth, 44.5 lead.

8. The joint assembly of a carbon body; an electrical conductor, and an alloy according to claim 5 wherein the alloy used is 48 bismuth, 28.5 lead, 14.5 tin, 9 antimony.

9. The joint assembly of a carbon body, an electrical conductor, and an alloy according to claim 5 wherein the alloy used is 15 antimony, 58 lead, 26 tin, 1 copper.

10. The joint assembly of a carbon body, an electrical conductor, and an alloy according to claim 5 wherein the alloy used is 15 antimony, 82 lead, 3 tin.

11. The joint assembly of a carbon body, an electrical conductor, and an alloy according to claim 5 wherein the electrical conductor is an externally threaded copper rod, wherein the carbon body contains the internally threaded recess, and wherein the carbon body is graphite.

12. The joint assembly of a carbon body, an electrical conductor, and an alloy according to claim 11 wherein the graphite body is a lead-in rod for use in electrolytic cells.

13. The joint assembly of a carbon body, an electrical conductor, and an alloy according to claim 1 wherein the connected threaded carbon body and electrical conductor are used at temperatures below the melting point of the alloy.

14. The joint assembly of a carbon body, an electrical conductor, and an alloy according to claim 5 wherein the connected threaded carbon body and electrical conductor are used at temperatures below the melting point of the alloy.

References Cited

UNITED STATES PATENTS 3,048,434   8/1962   Johnson.
3,055,789   9/1962   Gemmi.
3,399,322   8/1968   Ambe.

HYLAND BIZOT, Primary Examiner

U.S. Cl. X.R.

29—194; 174—126; 287—125

UNITED STATES PATENT OFFICE
CERTIFICATE OF CORRECTION

Patent No. 3,536,460     Dated October 27, 1970

Inventor(s) Marvin W. Voelker

It is certified that error appears in the above-identified patent and that said Letters Patent are hereby corrected as shown below:

Column 2, line 22, delete "construction" and insert --constructions--.

In Table I, line 69, re alloy d., under the "Electrical Resistivity" column, delete "9.82 x $10^{-5}$" and insert -- 0.82 x $10^{-5}$--.

Claim 1, line 2, delete "conduction" and insert --conductor--.

SIGNED AND
SEALED
FEB 9 1971

(SEAL)
Attest:

Edward M. Fletcher, Jr.
Attesting Officer

WILLIAM E. SCHUYLER, JR.
Commissioner of Patents